United States Patent [19]

Boyd et al.

[11] 4,029,469
[45] June 14, 1977

[54] COLORING PROCESS FOR SYNTHETIC TEXTILE MATERIALS

[75] Inventors: Violet Boyd; Brian Ribbons Fishwick; Brian Glover, all of Manchester, England

[73] Assignee: Imperial Chemical Industries Limited, London, England

[22] Filed: Oct. 8, 1975

[21] Appl. No.: 620,692

[30] Foreign Application Priority Data

Oct. 31, 1974 United Kingdom ............. 47112/74

[52] U.S. Cl. .................................... 8/41 C; 8/73;
8/179; 260/205; 260/207.1
[51] Int. Cl.[2] .................... C09B 27/00; D06P 1/02
[58] Field of Search .................. 8/41 C, 179, 73;
260/205, 207.1

[56] References Cited

UNITED STATES PATENTS

| | | | |
|---|---|---|---|
| 3,125,402 | 3/1964 | Kruckenberg | 8/41 |
| 3,337,522 | 8/1967 | Wegmuller | 260/158 |
| 3,775,049 | 11/1973 | Wolfrum et al. | 8/41 C |

FOREIGN PATENTS OR APPLICATIONS

| | | |
|---|---|---|
| 1,353,689 | 5/1974 | United Kingdom |
| 1,047,209 | 11/1966 | United Kingdom |

OTHER PUBLICATIONS

Venkataraman, "The Chemistry of Synthetic Dyes" vol. 3, (Academic Press, 1970) pp. 433–434.
Schmidlin, "Preparation and Dyeing of Synthetic Fibres" (Chapman & Hall, 1963) p. 274.

*Primary Examiner*—Joseph L. Schofer
*Assistant Examiner*—A. L. Clingman
*Attorney, Agent, or Firm*—Cushman, Darby & Cushman

[57] ABSTRACT

Process for coloring aromatic polyester textile materials which comprises applying to the said textile material by an aqueous dyeing, padding or printing process an aqueous dispersion of a water-insoluble monoazo dyestuff of the formula:-

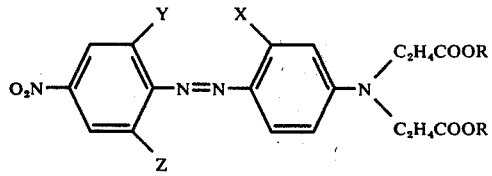

wherein X is hydrogen or methyl, Y and Z are each independently chlorine or bromine, and R is lower alkyl, and subsequently subjecting the colored textile material to a treatment in an aqueous solution of sodium hydrosulphite whereby the aromatic polyester textile materials are colored in brown shades of excellent fastness properties.

2 Claims, No Drawings

COLORING PROCESS FOR SYNTHETIC TEXTILE MATERIALS

This invention relates to a coloration process for aromatic polyester textile materials.

According to the invention there is provided a process for colouring aromatic polyester textile materials which comprises applying to the said textile material by an aqueous dyeing, padding or printing process an aqueous dispersion of a water-insoluble monoazo dyestuff of the formula:

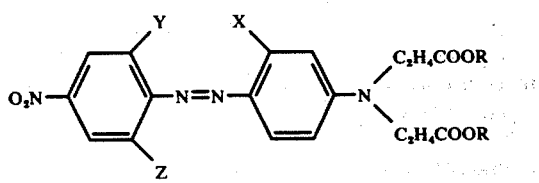

wherein X is hydrogen or methyl, Y and Z are each independently chlorine or bromine, and R is lower alkyl, and subsequently subjecting the coloured textile material to a treatment in an aqueous solution of sodium hydrosulphite.

The lower alkyl radicals represented by R are alkyl radicals containing from 1 to 4 1 carbon atoms, such as methyl, ethyl, n-propyl, isopropyl, sec-butyl and n-butyl radicals. Preferably R is methyl.

The process of the invention may be conveniently carried out by immersing the synthetic textile material in a dyebath comprising an aqueous dispersion of a monoazo dyestuff as hereinbefore defined, the dispersion being stabilised, if desired, by dispersing agents, for example non-ionic dispersing agents, cationic dispersing agents and anionic dispersing agents or a mixture of two or more such dispersing agents. Dyeing is then carried out at the temperature usually employed for the textile material. Thus the dyeing process can either be carried out at a temperature between 90° and 100° C, preferably in the presence of a carrier such as diphenyl or o-hydroxydiphenyl, or at a temperature above 100° C. preferably at a temperature between 120° and 140° C. under superatmospheric pressure, when a carrier is not usually necessary.

Alternatively an aqueous dispersion of the monoazo dyestuff can be padded onto the aromatic polyester textile material, and the dyestuff is fixed on the textile material by steaming it for short periods at temperatures between 100° and 160° C, or by baking it at temperatures between 160° and 220° C. If desired the padding liquor can contain the conventional additives, for example dispersing agents, thickeners, migration inhibitors, or urea.

As a further alternative a thickened printing paste containing the monoazo dyestuff in dispersed form can be applied to the surface of the aromatic polyester textile material by any of the methods conventionally used for applying printing pastes to aromatic polyester textile materials, for example by block, screen or roller printing. The printed textile material, optionally after being dried, is then steamed for short periods at temperatures between 100° and 160° 1 C, or is baked at temperatures between 160° and 220° C. Suitable thickening agents which are present in the printing paste include gum tragacanth, gum arabic, alginates, or oil-in-water or water-in-oil emulsions. The printing pastes can also contain conventional additives such as urea and sodium m-nitrobenzene sulphonate.

The coloured textile material is preferably rinsed in water and is then given a treatment for a short period in a warm aqueous solution of sodium hydrosulphite, preferably at a temperature between 50° C and 85° C. This treatment removes loosely attached dyestuff from the surface of the textile material. The textile material is then rinsed in water, is optionally given a "soaping" treatment for example in a warm aqueous solution of a synthetic detergent followed by a rinse in water, and is finally dried.

The aqueous solution of the sodium hydrosulphite preferably contains from 0.05 to 0.5%, by weight based on the weight of the solution, of sodium hydrosulphite. If desired the said solution can also contain an alkali, for example an alkali metal hydroxide such as sodium hydrocide, and/or a synthetic detergent preferably in an amount of from 0.05 to 0.5% by weight.

If desired mixtures of the said monoazo dyestuffs can be used.

The aromatic polyester textile materials used in the process of the invention are preferably polyethylene terephthalate textile materials. Such textile materials can be in the form of thread, yarn or woven or knitted fabric. If desired the said textile materials can be in the form of unions with other textile materials, for example aromatic polyester/cotton or aromatic polyester/wool unions.

By the process of the invention aromatic polyester textile materials are coloured in brown shades having excellent fastness to the fastness tests commonly applied to such textile materials, for example to light, to wet treatment and to dry heat treatment. The monoazo dyestuffs, as hereinbefore defined, also have excellent build-up properties on aromatic polyester textile materials so that deep shades can be readily obtained.

The monoazo dyestuffs used in the process of the invention can themselves be obtained by coupling a diazo compound of an amine of the formula:

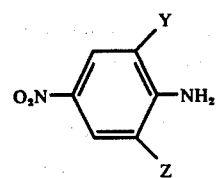

with a coupling component of the formula:

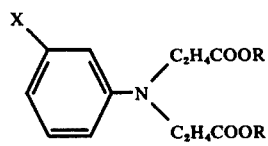

wherein R, X, Y and Z have the meanings stated.

The amines of the above formula are 2:6-di(chloro- or bromo-)-4- nitroaniline and 2-chloro-4-nitro-6-bromoaniline, and the coupling components include N:N-di(β-methoxycarbonylethyl)aniline, N:N-di(β-ethoxycarbonylethyl)aniline, N:N-di(β-ethoxycarbonylethyl)-m-toluidine, N:N-di[β-(n-butoxycarbonyl)ethyl]-m-toluidine and N:N-di[β-(isopropoxycarbonyl)ethyl]aniline.

The invention is illustrated but not limited by the following Examples in which the parts and percentages are by weight.

EXAMPLE 1

100 Parts of a woven aromatic polyester textile material are immersed in a dyebath comprising a dispersion of 1 part of 2-chloro-4-nitro-6-bromo-4'-[N:N-di(β-methoxycarbonylethyl)amino]azobenzene in 3000 parts of water containing 1 part of oleyl sodium sulphate. The dyebath is then heated to 130° C during 30 minutes and maintained at this temperature for a further hour under superatmospheric pressure. The dyed textile material is then removed from the dyebath, rinsed in water, immersed for 15 minutes in an aqueous solution at 50° C. containing 0.2% of sodium hydrosulphite and 0.1% of cetyl trimethylammonium bromide. The textile material is again rinsed in water, then immersed for 15 minutes in a warm dilute aqueous solution of a synthetic detergent, rinsed again in water and finally dried.

The aromatic polyester textile material is thereby dyed a brown shade possessing excellent fastness to light, to wet treatments and to dry heat treatments.

EXAMPLE 2

10 parts of a 10% aqueos dispersion of 2-chloro-4-nitro-6-bromo-4'-[N:N-di(β-ethoxycarbonylethyl)amino]azobenzene is added to a mixture of 2 parts of an aqueous emulsion of sulphonated sperm oil and pine oil, 10 parts of urea, 1 part of sodium m-nitrobenzenesulphonate, 0.6 parts of sodium hexametaphosphate, 48.4 parts of a 10% aqueous solution of sodium alginate and 28 parts of water, and the resulting print paste is printed onto a knitted aromatic polyester textile material. The printed material is dried and is then steamed for 6 minutes in superheated steam at 170° C. The material is then rinsed in water, treated for 5 minutes in an aqueous solution containing 0.2% of sodium hydroxide and 0.2% of sodium hydrosulphite at 60° C, rinsed again in water, and is finally dried.

A brown print is obtained having excellent fasteness to wet treatments and there is no staining of the unprinted areas.

Instead of steaming the printed material in order to fix the dyestuff, the printed material is baked for 1 minute at 200° C. A similar result is obtained.

EXAMPLE 3

A padding liquor comprising a mixture of 5 parts of a 10% aqueous dispersion of 2:6-dichloro-4-nitro-4'-[N:N-di(β-methoxycarbonylethyl)amino]azobenzene, 1 part of a 25% aqueous solution of the sodium salt of partially hydrolysed polyacrylonitrile and 94 parts of water is continuously padded onto a woven aromatic polyester textile material, and after drying the material is continuously passed through a baker operating at 220° C, the time of contact being 1 minute. The material is then rinsed in water, treated for 15 minutes at 70° C in an aqueous solution containing 0.2% of sodium hydroxide and 0.2% of sodium hydrosulphite detergent, rinsed in water, treated for 10 minutes in a 0.2% aqueous solution of a synthetic detergent at 50° C, rinsed again in water and is finally dried.

The textile material is coloured overall in a brown shade possessing excellent fastness to wet treatments.

In place of the dyestuffs used in the above Examples there are used any of the following dyestuffs whereby similar results are obtained.

2-chloro-4-nitro-6-bromo-2'-methyl-4'-[N:N-di(β-methoxycarbonylethyl)amino]azobenzene, 2:6-dibromo-4-nitro-4'-[N:N-di(β-methoxycarbonylethyl)amino]azobenzene 2:6-dichloro-4-nitro-2'-methyl-4'-[N:N-di(β-methoxycarbonylethyl)amino]azobenzene, and 2-chloro-4-nitro-6-bromo-4'-[N:N-di(β-n-butoxycarbonylethyl)amino]azobenzene.

We claim:

1. Process for colouring aromatic polyester textile materials which comprises applying to the said textile material by an aqueous dyeing, padding or printing process an aqueous dispersion of a water-insoluble monoazo dyestuff of the formula:

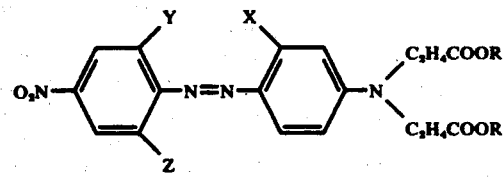

wherein X is hydrogen or methyl, Y and Z are each independently chlorine or bromine, and R is lower alkyl, and subsequently subjecting the coloured textile material to a treatment in an aqueous solution containing from 0.05 to 0.5% of sodium hydrosulphite at a temperature of from 50° to 85° C.

2. Process as claimed in claim 1 wherein the aqueous solution of sodium hydrosulphite additionally contains from 0.05 to 0.5% of an alkali metal hydroxide.

* * * * *